United States Patent
Koshta et al.

(10) Patent No.: US 10,314,099 B2
(45) Date of Patent: Jun. 4, 2019

(54) COMMUNICATION PROTOCOL RECOVERY SYSTEM AND METHOD

(71) Applicant: Intel IP Corporation, Santa Clara, CA (US)

(72) Inventors: Nirlesh K. Koshta, Bangalore (IN); Anikethan R. V, Bengaluru (IN)

(73) Assignee: Intel IP Corporation, Santa Clara, CA (US)

(*) Notice: Subject to any disclaimer, the term of this patent is extended or adjusted under 35 U.S.C. 154(b) by 233 days.

(21) Appl. No.: 15/201,401

(22) Filed: Jul. 2, 2016

(65) Prior Publication Data

US 2018/0007729 A1 Jan. 4, 2018

(51) Int. Cl.
| | |
|---|---|
| H04L 12/24 | (2006.01) |
| H04L 12/26 | (2006.01) |
| H04L 29/08 | (2006.01) |
| H04W 60/00 | (2009.01) |
| H04W 76/18 | (2018.01) |
| H04W 76/19 | (2018.01) |
| H04W 84/04 | (2009.01) |
| H04W 88/06 | (2009.01) |
| H04W 88/08 | (2009.01) |

(52) U.S. Cl.
CPC ......... *H04W 76/18* (2018.02); *H04L 41/0672* (2013.01); *H04L 43/16* (2013.01); *H04L 67/28* (2013.01); *H04W 60/005* (2013.01); *H04W 76/19* (2018.02); *H04W 84/042* (2013.01); *H04W 88/06* (2013.01); *H04W 88/08* (2013.01)

(58) Field of Classification Search
CPC ......... H04L 12/26; H04L 29/08; H04L 43/16; H04L 67/28; H04L 41/0672; H04W 60/00; H04W 76/18; H04W 76/027; H04W 60/005; H04W 84/042; H04W 88/08; H04W 88/06
See application file for complete search history.

(56) References Cited

U.S. PATENT DOCUMENTS

| | | | | |
|---|---|---|---|---|
| 2012/0307621 | A1* | 12/2012 | Zawaideh | H04W 76/19 370/216 |
| 2013/0095806 | A1* | 4/2013 | Salkintzis | H04L 65/601 455/414.3 |
| 2013/0100795 | A1* | 4/2013 | Zhao | H04W 36/0016 370/216 |
| 2013/0316699 | A1* | 11/2013 | Jheng | H04W 48/18 455/423 |

(Continued)

OTHER PUBLICATIONS

Extended European Search Report dated Dec. 11, 2017. Application No. 17175599.4.

*Primary Examiner* — Charles C Jiang
*Assistant Examiner* — Kyaw Z Soe
(74) *Attorney, Agent, or Firm* — Schiff Hardin LLP

(57) ABSTRACT

A wireless communication recovery method and a corresponding communication device are described. In the wireless communication recovery method, a connection failure of a radio access technology (RAT) is detected. Further, the detected connection failure is categorized based on a network level at which the connection failure has occurred. The RAT at the corresponding network level is then disabled for a time period based on the categorization of the connection failure and service in the RAT is recovered based on thresholds for the categorized failure levels.

27 Claims, 9 Drawing Sheets

(56) References Cited

U.S. PATENT DOCUMENTS

| | | | | |
|---|---|---|---|---|
| 2014/0233396 A1* | 8/2014 | Marinier | ............... | H04W 72/02 |
| | | | | 370/242 |
| 2014/0355417 A1* | 12/2014 | Kim | ..................... | H04W 24/04 |
| | | | | 370/221 |
| 2015/0049707 A1* | 2/2015 | Vajapeyam | ........... | H04W 24/10 |
| | | | | 370/329 |
| 2015/0264738 A1* | 9/2015 | Lee | ....................... | H04W 76/18 |
| | | | | 370/228 |

* cited by examiner

COMMUNICATION PROTOCOL RECOVERY SYSTEM AND METHOD

BACKGROUND

Field

Aspects described herein generally relate to the recovery of service for a communication protocol, including the recovery of service during registration failures.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, references to the Long-Term Evolution (LTE) standard are made. However, the more generic terms "mobile device" and "base station" are used herein except where otherwise noted to refer to the LTE terms "User Equipment (UE)" and "eNodeB/eNB," respectively.

As an overview, a communication protocol can establish conditions for registration of a mobile device with the network. For example, in LTE, in response to multiple registration failures within a given location, the mobile device can be prevented from attempting a registration for a predetermined period of time. For example, 3rd Generation Partnership Project's (3GPP) 3GPP TS 24.301 standard defines a timer (e.g., timer T3402) that provides a time period before another registration attempt can be made after multiple registration failures. In some cases, the LTE protocol can require that the mobile device disable its LTE radio accesses technology (RAT) for a period of time.

Figure 4:
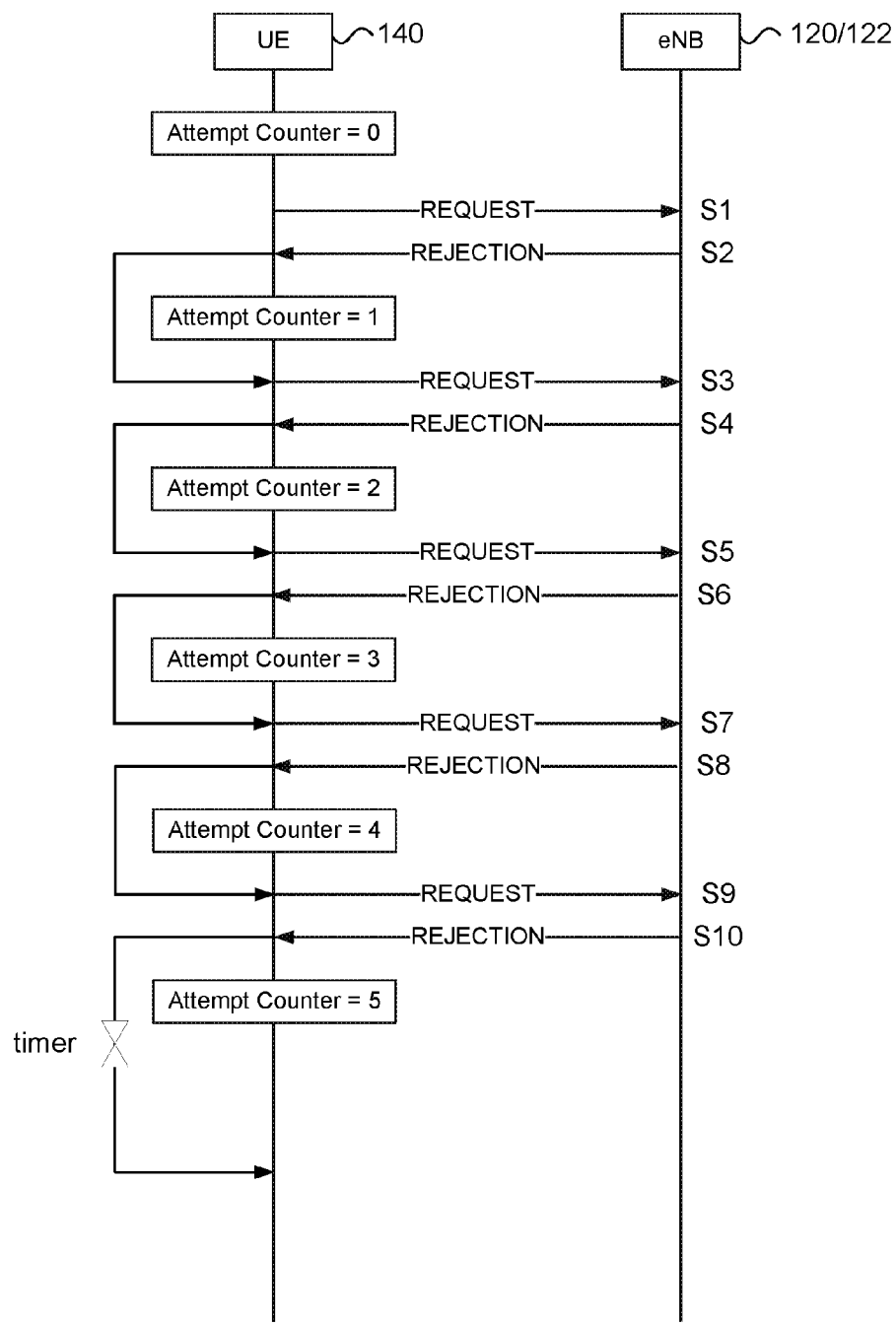
FIG. 4 illustrates a registration sequence according to an exemplary aspect of the present disclosure.

Turning to FIG. 4, a registration failure sequence according to one or more exemplary aspects of the present disclosure is illustrated.

The registration failure sequence is applicable for an attach request and/or a Tracking Area Update (TAU) procedure. For example, in an attach procedure, the UE (mobile device) 140 (see FIGS. 1 and 2) transmits a REQUEST message (e.g., an Attach or TAU REQUEST message) to the LTE network (e.g., eNB (base station) 120; see FIGS. 1 and 3) (step S1). In response to the REQUEST message, the LTE network (base station 120) can reject the request and reply to the mobile device 140 with a REJECT message (step S2). In response to the REJECT message, the mobile device 140 can wait for a period of time (e.g., based on a timer, such as 3GPP's T3411 timer) before retransmitting another REQUEST message to the LTE network (e.g., after the timer T3411 expires) (step S3).

In operation, the mobile device 140 can be configured to maintain an attempt counter that accumulates the number of subsequently rejected attempts. In this example, the attempt counter is used to limit the number of subsequently rejected attempts. If the retransmitted REQUEST message is rejected again (step S4), the attempt counter is incremented and the retry process can be repeated until the attempt counter reaches a predetermined value (e.g., 5) (steps S5-S10). After the attempt counter reaches the predetermined value (e.g., 5th failed attempt), the mobile device 140 initiates a timer (e.g., 3GPP's T3402 timer) to delay further retry attempts. In this example, the mobile device 140 is prevented from attempting another registration attempt until the time expires. In some aspects, the mobile device 140 can disable its LTE RAT until the timer expires or longer. In this example, the mobile device 140 can be configured to register with another communication network, such as a Universal Mobile Telecommunications System (UMTS) RAT. The mobile device 140 can disable evolved Universal Terrestrial Radio Access Network (EUTRAN) capabilities in response to repeated registration attempt failures.

Using this configuration, the LTE network can reduce frequent processing of the retry attempts of, for example, Attach and/or TAU procedures. This allows for the greater availability of system resources of the LTE network for other operations and/or for the mobile device to identify service in UMTS/GSM RATs.

Figure 1:
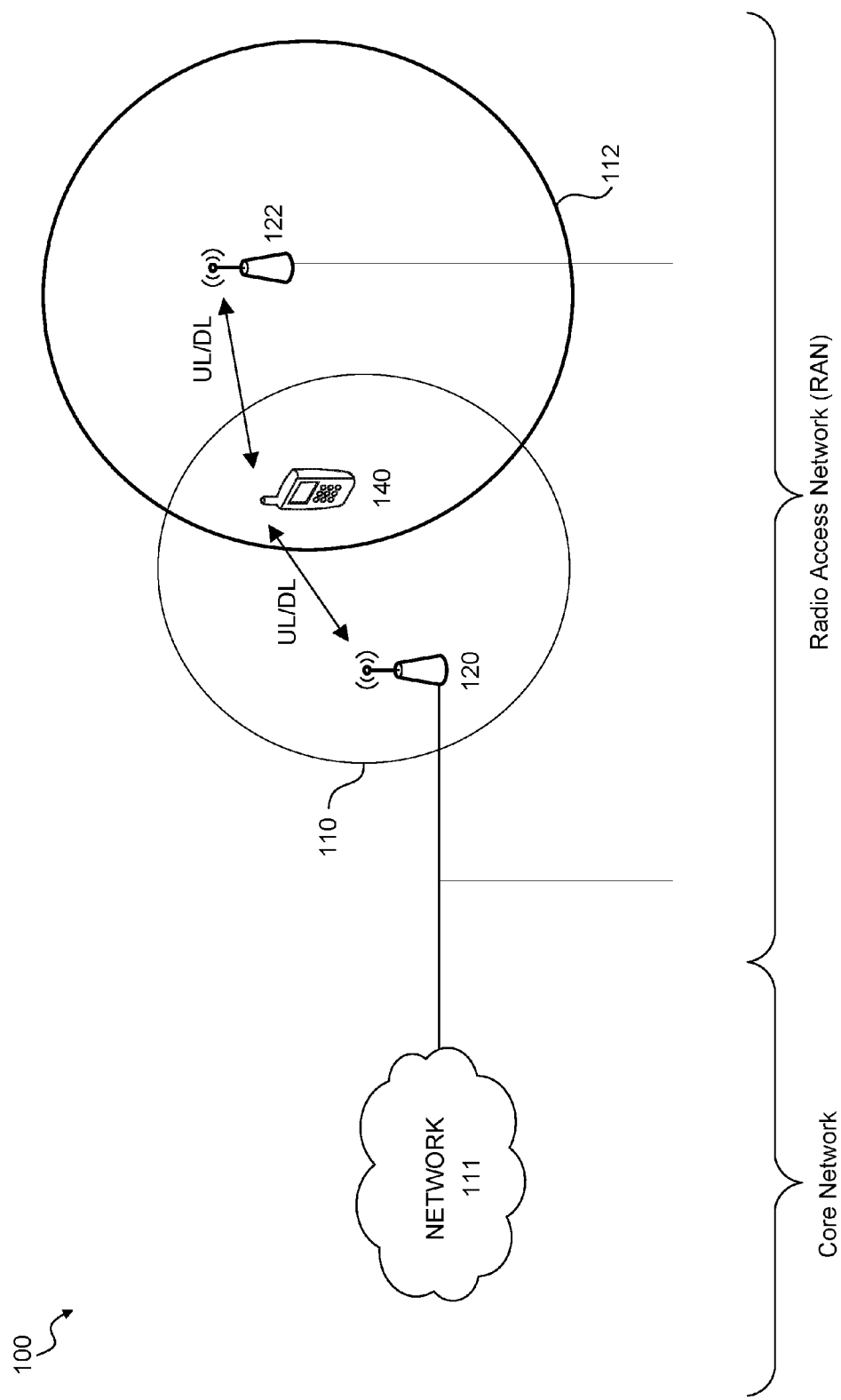
FIG. 1 illustrates an example network environment.

FIG. 1 illustrates an example communication environment 100 that includes a radio access network (RAN) and a core network. The RAN includes one or more base stations 120, one or more base stations 122, and one or more mobile devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base station(s) 120 and/or base station(s) 122 communicate with one or more service providers and/or one or more other base stations via the backhaul communication network 111. In an exemplary aspect, the backhaul communication network is an internet protocol (IP) backhaul network. The number of base stations 120, base stations 122, mobile devices 140, and/or networks 111 are not limited to the quantities illustrated in FIG. 1, and the communication environment 100 can include any number of the various components as would be understood by one of ordinary skill in the relevant art(s). In an exemplary aspect, the base stations 120 and 122 support first and second wireless communication protocols, respectively. The first and second wireless communication protocols can be the same or different. For example, the first wireless communication protocol of the base station 120 can be the LTE protocol and the wireless communication protocol of the base station 122 can be a UMTS protocol (e.g., Global System for Mobile Communications (GSM), Code division multiple access (CDMA), wideband CDMA (WCDMA), etc.).

In an exemplary aspect, the base station 120 supports two or more wireless communication protocols and/or the base station 122 supports two or more wireless communication protocols. In this example, one or more of the protocols supported by the base station 120 can be the same or different with respect to one or more protocols supported by the base station 122.

The mobile device 140 and the base stations 120 and/or 122 can each include a transceiver configured to transmit and/or receive wireless communications via one or more wireless technologies within the communication environment 100. In operation, the mobile device 140 can be configured to communicate with the base station 120 in a serving cell or sector 110 and/or communicate with the base station 122 in a serving cell or section 112. For example, the mobile device 140 receives signals on one or more downlink (DL) channels from the base station 120 and base station 122, and transmits signals to the base station 120 and/or the base station 122 on one or more respective uplink (UL) channels.

As discussed above, the service cell or sections 110 and/or 112 can support one or more communication protocols and one or more of the protocols of the serving cell or sector 110 can be different or the same as the protocol(s) of the serving cell or sector 112. In an exemplary aspect, the serving cell or sector 110 utilizes the LTE protocol while the serving cell or sector 112 utilizes one or more other communication protocols (e.g. GSM, CDMA, UMTS). In this example, the mobile device 140 can be configured to move into a third serving cell or sector (see FIGS. 5-7) supported by a third base station while remaining within the serving cell or section 112. In some aspects, when moving into the third serving cell or sector, the mobile device 140 remains within the serving cell or sector 110 (e.g., similar to the aspects illustrated in FIGS. 5-7), but is not limited thereto. For example, the mobile device 140 can leave serving cell or sector 110 when entering the third serving cell or sector.

Figure 2:
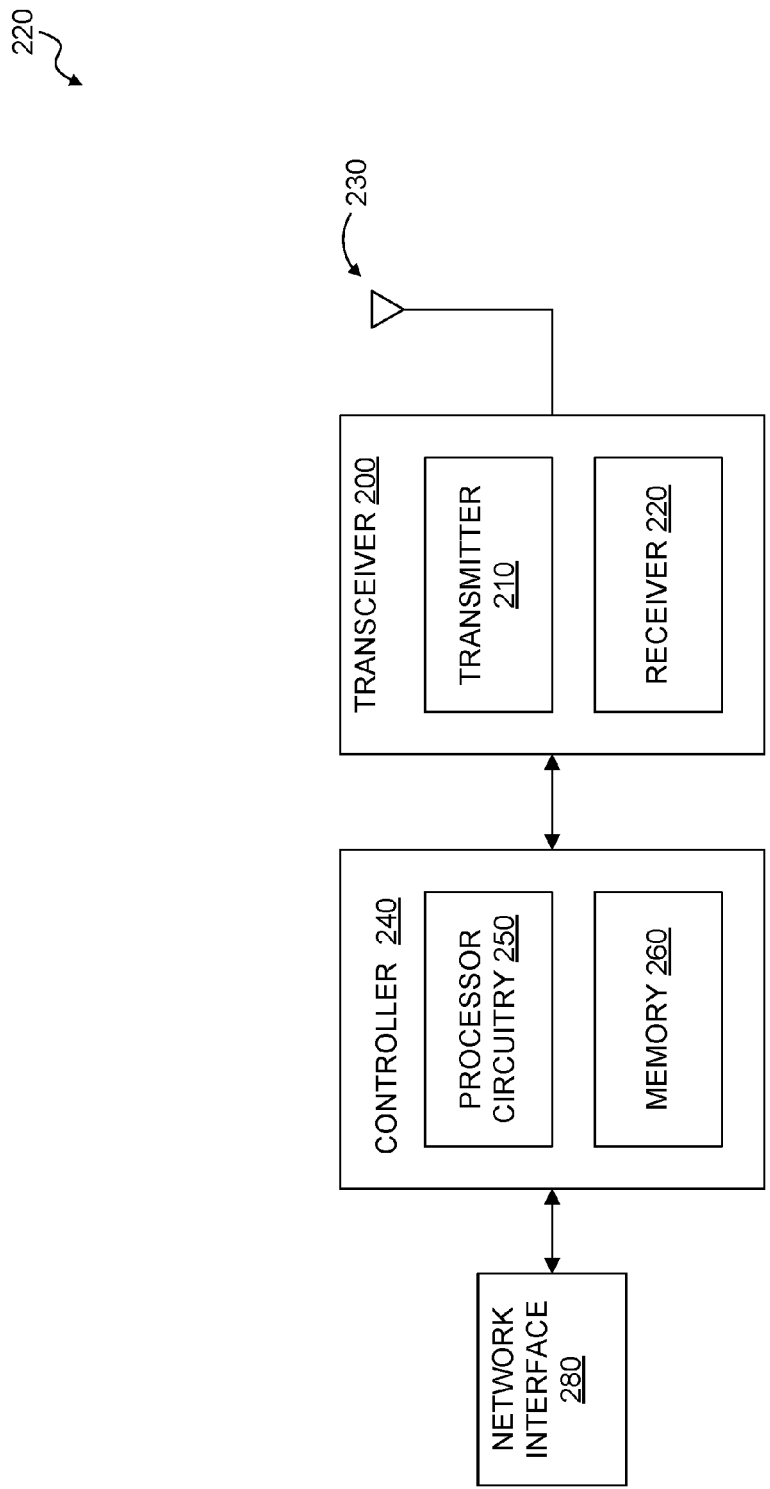
FIG. 2 illustrates a base station according to an exemplary aspect of the present disclosure.

FIG. 2 illustrates the base station 220 according to an exemplary aspect of the present disclosure. The base station 220 can be an exemplary aspect of the base station 120 and/or the base station 122. The base station 220 can include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 220 can be configured for wireless communication utilizing a Multiple-input Multiple-output (MIMO) configuration.

In an exemplary aspect, the transceiver 200 is configured for wireless communications conforming to, for example, the Long-Term Evolution (LTE) protocol. In this example, the transceiver 200 can be referred to as LTE transceiver 200. In an exemplary aspect, the transceiver 200 is configured for wireless communications conforming to, for example, one or more other communication protocols (e.g. GSM, CDMA, UMTS). Those skilled in the relevant art(s) will understand that the transceiver 200 is not limited these exemplary communication protocols, and can be configured for communications that conform to one or more other protocols.

The network interface 280 includes processor circuitry that is configured to transmit and/or receive communications via one or more wired technologies to/from the backhaul communication network 111. Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120/122 and/or one or more components of the base station 120/122. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.).

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
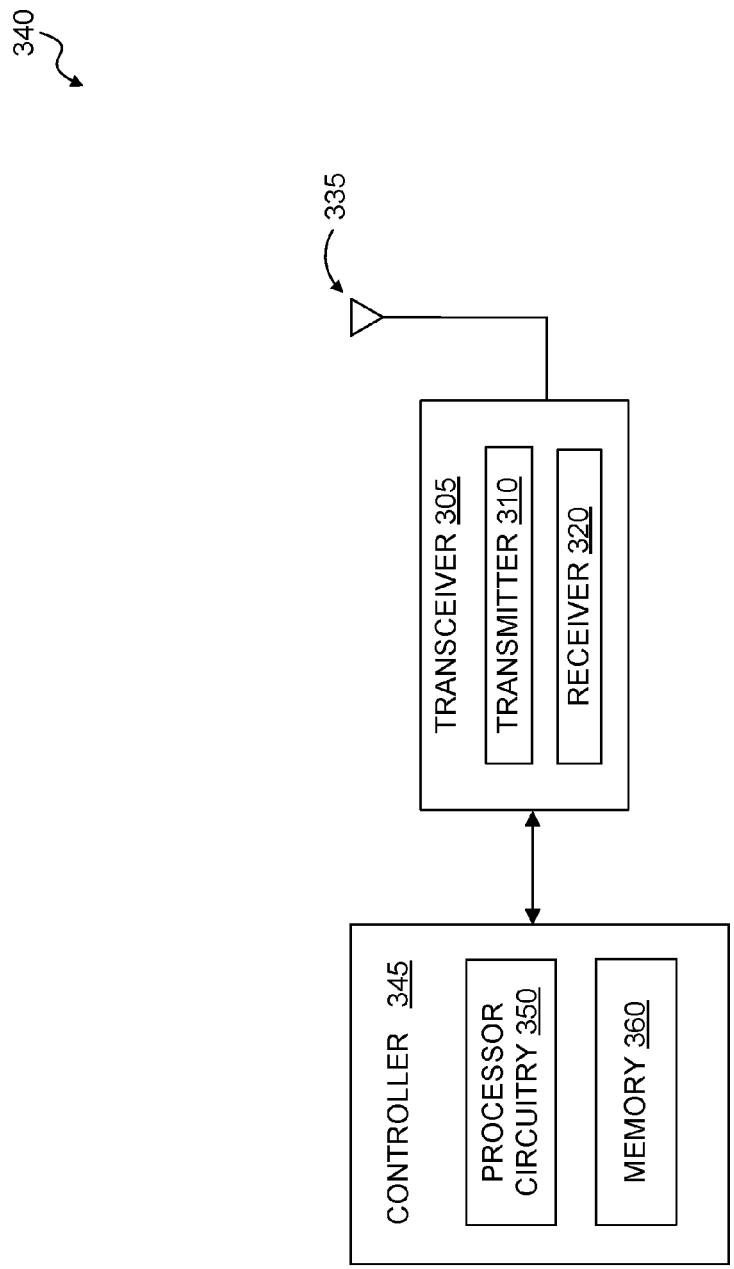
FIG. 3 illustrates a mobile device according to an exemplary aspect of the present disclosure.

FIG. 3 illustrates a mobile device 340 according to an exemplary aspect of the present disclosure. The mobile device 340 can be an exemplary aspect of the mobile device 140. The mobile device 340 is configured to transmit and/or receive wireless communications via one or more wireless technologies. For example, the mobile device 340 can be configured for wireless communications conforming to, for example, the Long-Term Evolution (LTE) protocol and one or more other communication protocols (e.g. GSM, CDMA, UMTS, other 3GPP protocols), but is not limited thereto.

The mobile device 340 can be configured to communicate with one or more other communication devices, including, for example, one or more base stations, one or more access points, one or more other mobile devices, and/or one or more other devices as would be understood by one of ordinary skill in the relevant arts.

The mobile device 340 can include a controller 345 communicatively coupled to one or more transceivers 305. The transceiver(s) 305 can be configured to transmit and/or receive wireless communications via one or more wireless technologies. The transceiver 305 can include processor circuitry that is configured for transmitting and/or receiving wireless communications conforming to one or more wireless protocols. For example, the transceiver 305 can include a transmitter 310 and a receiver 320 configured for transmitting and receiving wireless communications, respectively, via one or more antennas 335.

In exemplary aspects, the transceiver 305 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 may include an integer array of antennas, and that the antennas may be capable of both transmitting and receiving wireless communication signals. In aspects having two or more transceivers 305, the two or more transceivers 305 can have their own antenna 335, or can share a common antenna via a duplexer.

The controller 345 can include processor circuitry 350 that is configured to control the overall operation of the mobile device 340, such as the operation of the transceiver(s) 305. The processor circuitry 350 can be configured to control the transmitting and/or receiving of wireless communications via the transceiver(s) 305, and/or perform one or more baseband processing functions (e.g., media access control (MAC), encoding/decoding, modulation/demodulation, data symbol mapping; error correction, etc.). The processor circuitry 350 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 345 can include one or more elements of a protocol stack such as, a physical (PHY) layer, media access control (MAC), radio link control (RLC), packet data convergence protocol (PDCP), and/or radio resource control (RRC) elements.

The controller 345 can further include a memory 360 that stores data and/or instructions, where when the instructions are executed by the processor circuitry 350, controls the processor circuitry 350 to perform the functions described herein. The memory 360 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 360 can be non-removable, removable, or a combination of both.

Examples of the mobile device 340 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 340 may be a stationary communication device, including, for example, a stationary computing device—such as a personal computer (PC), a desktop computer, a computerized kiosk, and an automotive/aeronautical/maritime in-dash computer terminal.

As discussed above with reference to FIG. 4, conditions can be established for registration of a mobile device with the network and for registration failures. For example, in LTE, in response to multiple registration failures within a given location, the mobile device can be prevented from attempting a registration for a predetermined period of time. With respect to the 3GPP TS 24.301 standard, registration failures are treated the same. For example, a registration failure: (1) specific to a cell, (2) specific to a Tracking Area, (3) specific to a Mobility Management Entity (MME) (e.g., Tracking Area Identity (TAI) and/or TAI list), and (4) at the public land mobile network (PLMN) are treated the same way.

In exemplary aspects of the present disclosure, registration failures are categorized and addressed based on the categorization. By categorizing the registration failures, the operation(s) taken in response to the failure can be based on the type of failure (e.g., at which network level the failure has occurred). For example, registration failures specific to the current cell can be treated differently from a registration failure specific to the Tracking Area, the MME or the PLMN. In handling registration failures based on the category of the failure, delays in the recovery of the communication service (e.g., LTE) can be reduced and the efficiency of the mobile device and/or the communication service can be increased.

In an exemplary aspect, registration failures are addressed by categorizing the causes of the failure with respect to signal level: 1) cell level; 2) Tracking Area level; and 3) PLMN-RAT level. Based on the categorization, the cell, the tracking area, and/or PLMN can be blocked.

When the mobile device camps and registers on a different RAT, the network can be notified that the LTE has been disabled. This notification can include setting one or more bits in the Routing Area Update (RAU) and/or in a registration update message of the corresponding communication protocol (e.g., GPRS ATTACH message in UMTS/GSM protocols). This can ensure that the mobile device is not redirected to LTE by the network.

In this example, the mobile device can retain the capability of LTE RAT locally. When the mobile device is camped on the different RAT and is in idle mode, the mobile device can monitor neighboring LTE cells of the same PLMN or other equivalent PLMN. In an exemplary aspect, the mobile device can obtain necessary information from broadcast information of the camped RAT.

In an exemplary aspect, if the blocked LTE operations at the cell level (e.g., consecutive Random Access Channel (RACH) failures due to, for example, poor signal strength), LTE communications can be enabled and registration can be attempted in a new cell if, for example: a suitable LTE neighboring cell with a different cell identification (ID) is detected, and/or signal conditions of the blocked cell improve (e.g., exceed a predetermined threshold value) and the mobile device is in idle mode. As discussed in detail below, similar operations can be performed for failures categorized as a Tracking Area level failure.

Figure 5:
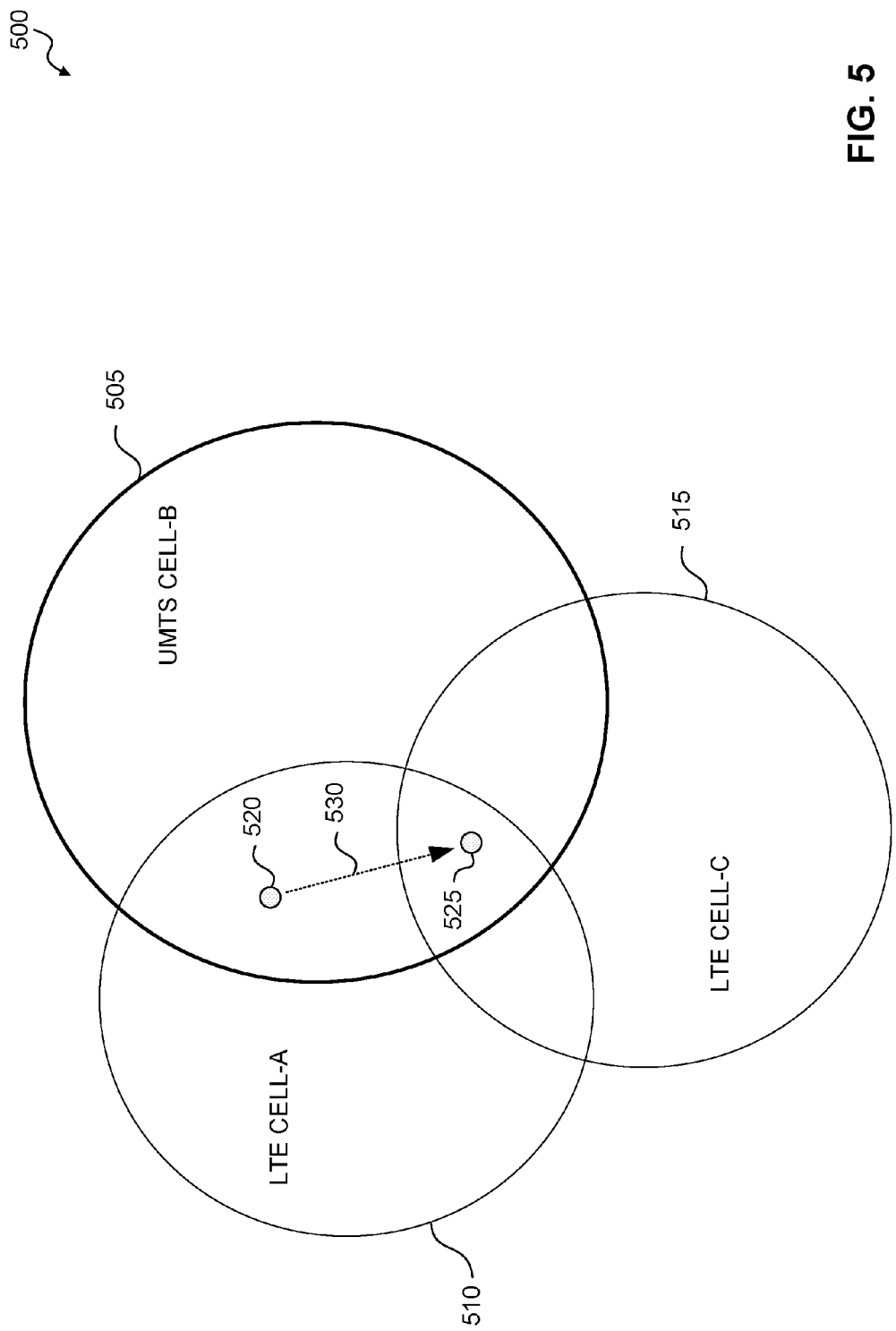
FIG. 5 illustrates a registration failure event according to an exemplary aspect of the present disclosure.
Figure 6:
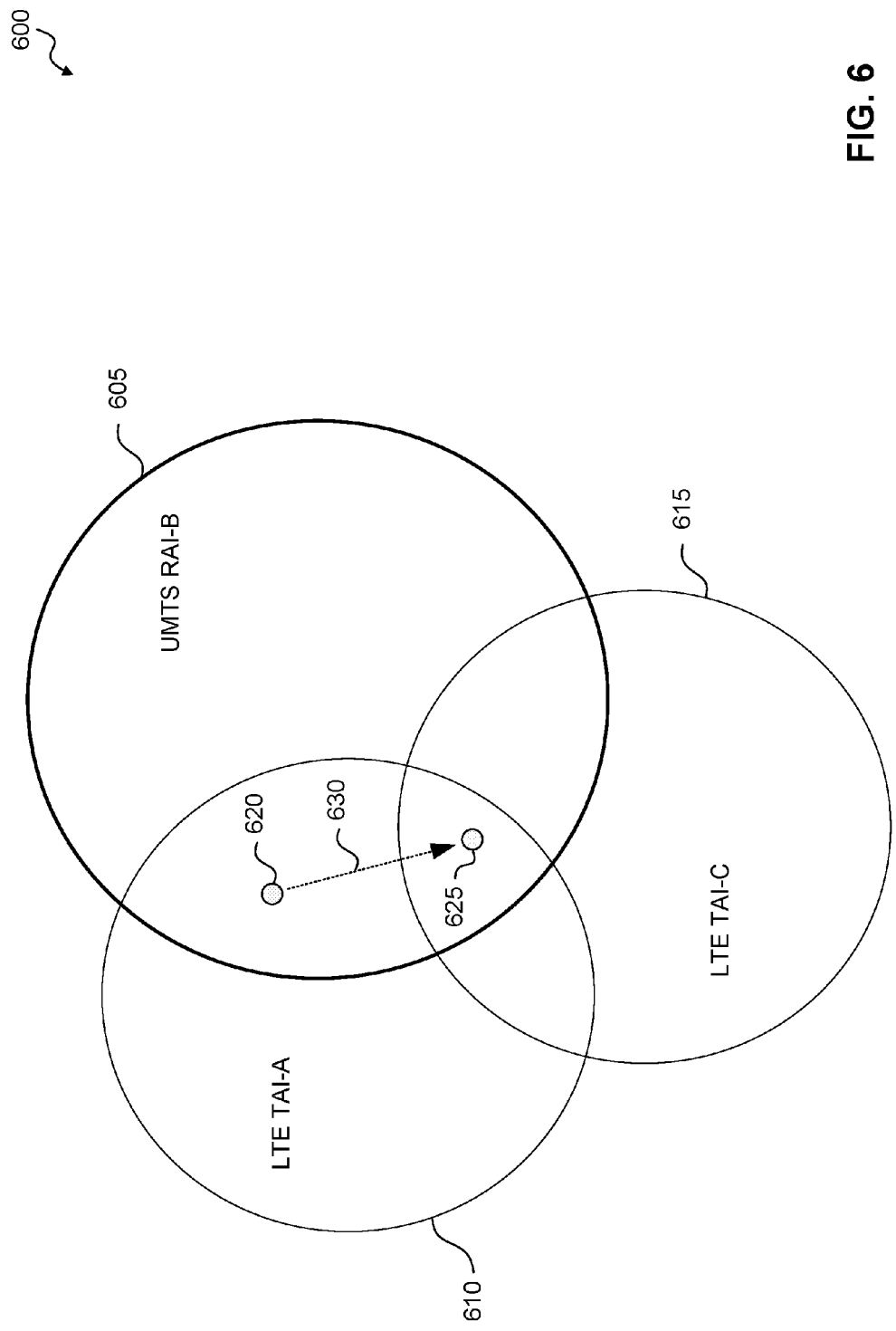
FIG. 6 illustrates a registration failure event according to an exemplary aspect of the present disclosure.
Figure 7:
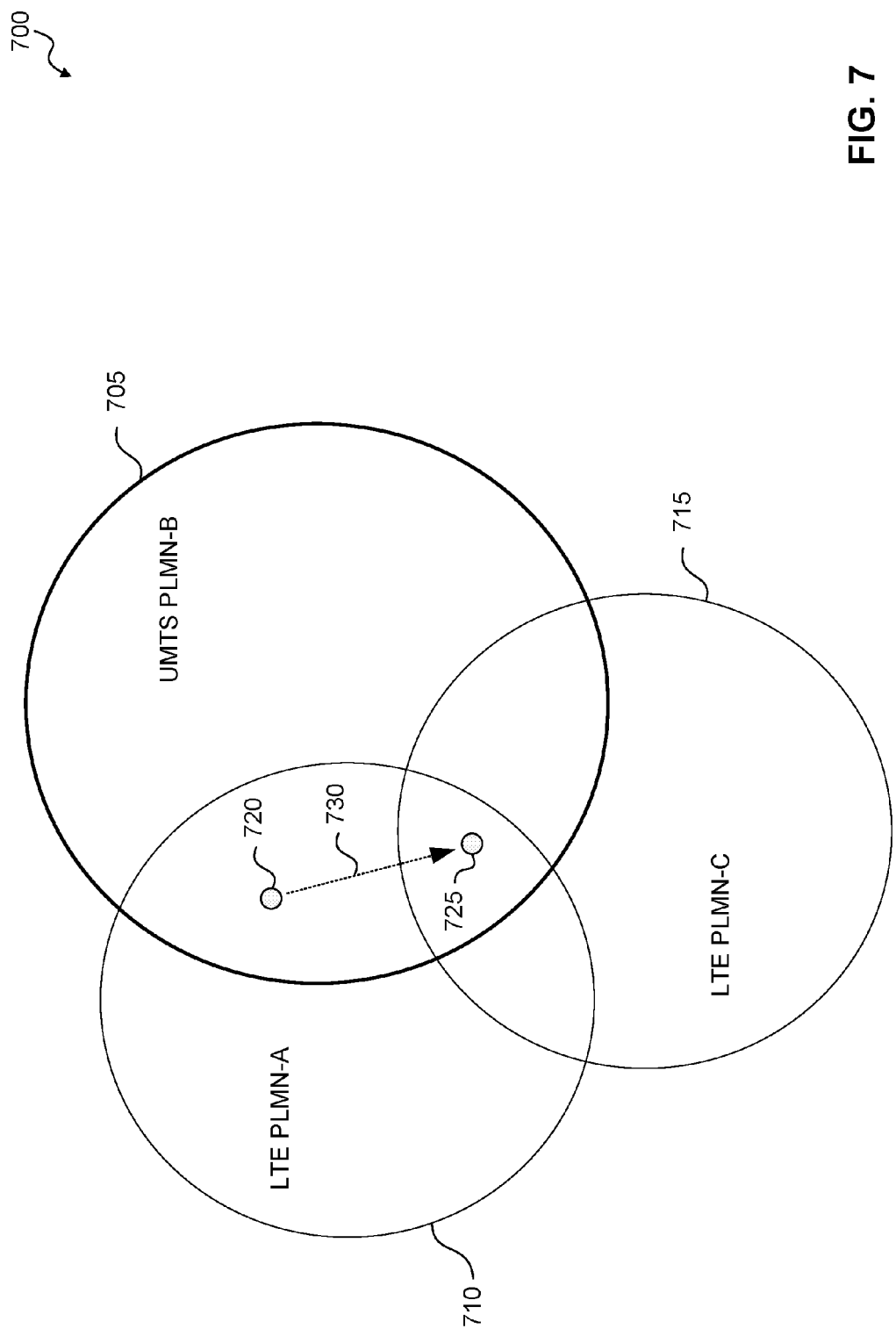
FIG. 7 illustrates a registration failure event according to an exemplary aspect of the present disclosure.

Turning to FIGS. 5-7, exemplary aspects of the operation of a mobile device and associated registration failure scenarios are illustrated. For example, FIG. 5 illustrates the movement of a mobile device between LTE cells during a failure, FIG. 6 illustrates the movement of a mobile device to a Tracking Area Identity (TAI) not present in the registered TAI list during a failure, and FIG. 7 illustrates the movement of a mobile device to a new PLMN during a failure.

FIG. 5 illustrates the movement (along path 530) of a mobile device (e.g., mobile device 340) from location 520 within LTE cell 510 to the new location 525 within LTE cell 515. In this example, as the mobile device moves from location 520 to location 525, the mobile device continues to be serviced by UMTS cell 505.

In an exemplary operation, the mobile device is camped and registered on the RAT LTE and is in IDLE mode. The mobile device selects a TAI cell (e.g. LTE cell 510) which is not present in the registered TAI list.

In response, the Evolved Packet System (EPS) Mobility Management (EMM for short) initiates TAU request. In this scenario, the TAU request fails due to consecutive Random Access Channel (RACH) failures (e.g., five failures as illustrated in FIG. 4). In this example, the RACH failures can result from the mobile device being unable to reach the network as a result of, for example, poor signal strength (e.g., the mobile device is within a building with poor coverage).

The EMM initiates a temporary LTE disabled timer in response to the RACH failures. In an exemplary aspect, the temporary LTE disabled timer is defined by the mobile device (e.g., processor circuitry 350 initiates a timer of a value obtained from memory 360) and disables the LTE communications of the mobile device until expiration of the timer. In another exemplary aspect, the temporary LTE disabled timer can be defined by the network (e.g., the timer has a duration of the 3GPP's T3402 timer).

As a result of the disabled LTE communications, the mobile device camps on RAT UMTS of the UMTS cell 505 and performs registration procedures, including, for example, RAU and location area uprate (LAU) procedures.

While camped on RAT UMTS, the mobile device moves from location 520 to location 525 within LTE cell 515 prior to the expiration of the temporary LTE disabled timer. Conventionally (e.g., 3GPP TS 24.301 standard), because the temporary LTE disabled timer is still running, the mobile device is unaware that a better LTE cell 515 may be available until expiration of the temporary LTE disabled timer.

However, as discussed above and in detail below with reference to FIG. 8, the mobile device 340 according to exemplary aspects can be configured to categorize the failure and to recovery LTE communications on the new LTE 515 based on the categorization of the failure. In this example, the mobile device 340 can recover LTE service as soon as a change in the servicing cell and/or better signal conditions of the current cell are detected in LTE by the mobile device 340.

In an exemplary aspect, the mobile device 340 can be additionally or alternatively configured for failure categorization operations for Non-Access Stratum (NAS) signaling procedure failures in which the LTE RAT is disabled and temporary LTE disabled timer is started (e.g., an Attach procedure).

FIG. 6 illustrates the movement (along path 630) of a mobile device (e.g., mobile device 340) from location 620 within LTE TAI 610 to the new location 625 within LTE TAI 615. In this example, as the mobile device moves from location 620 to location 625, the mobile device continues to be serviced by UMTS RAI 605.

In an exemplary operation, the mobile device is camped and registered on the RAT LTE and is in IDLE mode. The mobile device selects a TAI cell (e.g. LTE TAI 610) which is not present in the registered TAI list.

In response, the EMM initiates TAU request. In this scenario, the request fails due to consecutive TAU rejection failures (e.g., five failures as illustrated in FIG. 4).

The EMM initiates a temporary LTE disabled timer in response to the TAU rejection failures. In an exemplary aspect, the temporary LTE disabled timer is defined by the mobile device (e.g., processor circuitry 350 initiates a timer of a value obtained from memory 360) and disables the LTE communications of the mobile device until expiration of the timer. In another exemplary aspect, the temporary LTE disabled timer can be defined by the network (e.g., the timer has a duration of the 3GPP's T3402 timer).

As a result of the disabled LTE communications, the mobile device camps on RAT UMTS of the UMTS RAI 605 and performs registration procedures, including, for example, RAU & location area uprate (LAU) procedures.

While camped on RAT UMTS, the mobile device moves from location 620 to location 625 within LTE TAI 615 prior to the expiration of the temporary LTE disabled timer. Conventionally (e.g., 3GPP TS 24.301 standard), because the temporary LTE disabled timer is still running, the mobile device is unaware that a better TAI cell (i.e., LTE TAI 615) may be available until expiration of the temporary LTE disabled timer.

However, as discussed above and in detail below with reference to FIG. 9, the mobile device 340 according to exemplary aspects can be configured to categorize the failure and to recovery LTE communications on the new LTE TAI 615 based on the categorization of the failure. In this example, the mobile device 340 can recover LTE service as soon as a change in cell/better signal conditions are detected in LTE by the mobile device 340.

In an exemplary aspect, the mobile device 340 can be additionally or alternatively configured for failure categorization operations for Radio Resource Control (RRC) connection failure or RRC connection release cases, and/or Non-Access Stratum (NAS) signaling procedure failures in which the LTE RAT is disabled and temporary LTE disabled timer is started (e.g., an Attach procedure).

FIG. 7 illustrates the movement (along path 730) of a mobile device (e.g., mobile device 340) from location 720 within LTE PLMN 710 to the new location 725 within LTE PLMN 715. In this example, as the mobile device moves from location 720 to location 725, the mobile device continues to be serviced by UMTS PLMN 705.

In an exemplary operation, the mobile device is camped and registered on the RAT LTE and is in IDLE mode. In this example, the mobile device does not support Internet Protocol Multimedia Subsystem (IMS). The network provides the mobile device a TAU Accept message with an Equivalent PLMN (EPLMN) list including LTE PLMN 710, LTE PLMN 715, and UMTS PLMN 705.

The mobile device selects a PLMN cell (e.g. LTE PLMN 710) which is not present in the registered TAI list maintained by the mobile device. In response, the EMM initiates a TAU request. In this scenario, the request fails due to consecutive failures (e.g., five failures as illustrated in FIG. 4) of Combined TAU Accept messages with cause (e.g., Mobile switching center (MSC) temporary not reachable).

The EMM initiates a temporary LTE disabled timer in response to the TAU rejection failures. In an exemplary aspect, the temporary LTE disabled timer is defined by the mobile device (e.g., processor circuitry 350 initiates a timer of a value obtained from memory 360) and disables the LTE communications of the mobile device until expiration of the timer. In another exemplary aspect, the temporary LTE disabled timer can be defined by the network (e.g., the timer has a duration of the 3GPP's T3402 timer).

As a result of the disabled LTE communications, the mobile device camps on RAT UMTS of the UMTS PLMN 705 and performs registration procedures, including, for example, RAU & location area uprate (LAU) procedures.

While camped on RAT UMTS, the mobile device moves from location 720 to location 725 within LTE PLMN 715 prior to the expiration of the temporary LTE disabled timer. Conventionally (e.g., 3GPP TS 24.301 standard), because the temporary LTE disabled timer is still running, the mobile device is unaware that a better TAI cell (i.e., LTE TAI 715) may be available until expiration of the temporary LTE disabled timer.

However, as discussed above, the mobile device 340 according to exemplary aspects can be configured to categorize the failure and to recovery LTE communications on the new LET PLMN 715 based on the categorization of the failure. In this example, the mobile device 340 can recover LTE service as soon as a change in cell/better signal conditions are detected in LTE by the mobile device 340.

In an exemplary aspect, the mobile device 340 can be additionally or alternatively configured for failure categorization operations for Combined TAU Accept messages with one or more causes, including the CS Domain is not available, a Network failure, and/or where the mobile device supports IMS but the LTE PLMN 710 (or the TAI 610) does not support IMS causing the mobile device to disable the RAT LTE and initiate the temporary LTE disabled timer.

In an exemplary aspect, the mobile device 340 is configured to perform failure categorization and failure handling operations as set forth in Table 1 below.

TABLE 1

| Failure Cause (Category) | Action taken by Mobile Device | Trigger to Enable LTE |
| --- | --- | --- |
| Max Attempts reached due to RACH failure | Block LTE only for the current camped cell | If signal strength of the blocked cell exceeds predefined threshold or if a new cell is entered. |
| Max attempts reached due to temporary reject cause/Other temporary failures | Block LTE only for the current camped Tracking area | If cell of a new Tracking Area for the same/ Equivalent PLMN is detected as part of neighbor cell measurements |

TABLE 1-continued

| Failure Cause (Category) | Action taken by Mobile Device | Trigger to Enable LTE |
| --- | --- | --- |
| Interleaving of RACH Failure/Temporary reject cause | Block LTE only for the current camped Tracking area | If cell of a new Tracking Area for the same/ Equivalent PLMN is detected as part of neighbor cell measurements |

Figure 8:
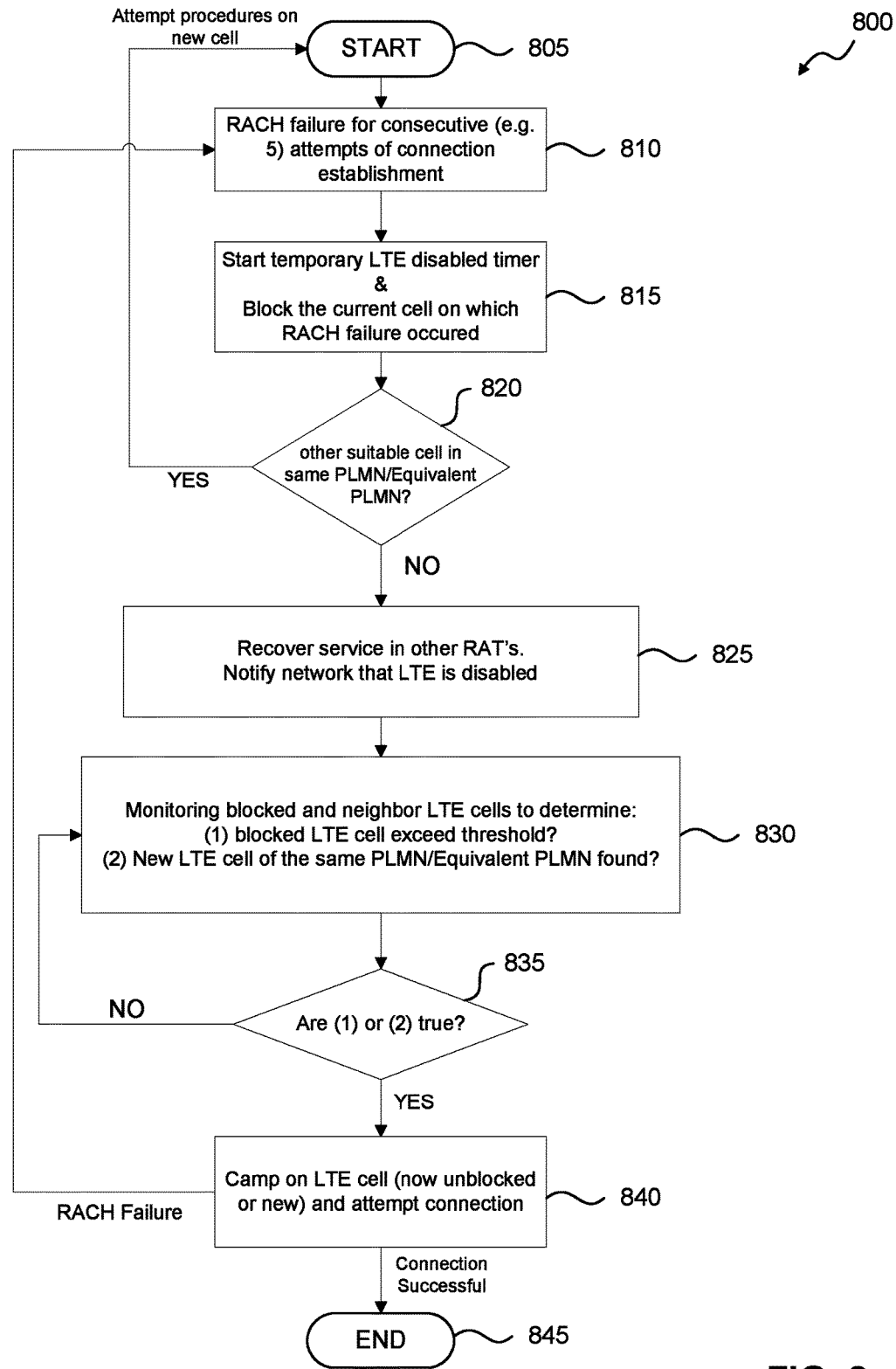
FIG. 8 illustrates communication protocol recovery method according to an exemplary aspect of the present disclosure.

FIG. 8 illustrates a flowchart of communication protocol recovery method 800 of failures within a communication cell according to an exemplary aspect of the present disclosure. The flowchart is described with continued reference to FIGS. 1-7. The steps of the method are not limited to the order described below, and the various steps may be performed in a different order. Further, two or more steps of the method may be performed simultaneously with each other.

The method of method 800 begins at step 805 and transitions to step 810, where consecutive Random Access Channel (RACH) failures (e.g., five failures as illustrated in FIG. 4) have occurred in response to attempts for connection establishment on, for example, an LTE cell (e.g., LTE 515 of FIG. 5). In an exemplary aspect, the EMM initiates a TAU request, which fails due to consecutive RACH failures. In this example, the RACH failures can result from the mobile device being unable to reach the network as a result of, for example, poor signal strength (e.g., the mobile device is within a building with poor coverage).

After step 810, the method 800 transitions to step 815, where a temporary LTE disabled timer is initiated in response to the consecutive RACH failures and communications on the current LTE cell (e.g. LTE 510) are blocked. In an exemplary aspect, only the current LTE cell (e.g., the cell servicing the mobile device when the consecutive RACH failures have occurred) is blocked. In this example, the temporary LTE disabled timer prevents LTE communications with only the blocked LTE cell until the timer expires.

In an exemplary aspect, the EMM initiates the temporary LTE disabled timer in response to the RACH failures. In an exemplary aspect, the temporary LTE disabled timer is defined by the mobile device (e.g., processor circuitry 350 initiates a timer of a value obtained from memory 360) and disables the LTE communications of the mobile device until expiration of the timer. In another exemplary aspect, the temporary LTE disabled timer can be defined by the network (e.g., the timer has a duration of the 3GPP's T3402 timer).

In an exemplary aspect, the mobile device 340 is configured to disable LTE communication based on the temporary LTE disabled timer for the blocked cell. For example, the mobile device 340 can disable the LTE communications in response to the timer being initiated by the EMM. In operation, the mobile device 340 can disable LTE communication with only the blocked cell.

In an exemplary aspect, the mobile device 340 is configured to categorize the failure as a failure on the cell level. That is, there may be other LTE cells within the tracking area or the PLMN that can serve the mobile device. By categorizing the failure to a cell level failure on the current serving cell, the mobile device 340 can block communications only to the serving cell in which the failure occurred. That is, the blocked communications via the temporary LTE disabled timer apply only to the blocked cell (e.g., cell 510). Therefore, as discussed in detail below, the mobile device 340 can recover LTE service as soon as a change in the servicing cell (e.g., cell 515) and/or better signal conditions of the current cell (e.g., 510) are detected by the mobile device 340.

After step 815, the method 800 transitions to step 820, where it is determined whether there are one or more other suitable cells within the PLMN or within an equivalent PLMN. For example, the mobile device determines that another suitable LTE cell within the same PLMN is available.

If available (YES at step 820), the flowchart 800 returns to step 805 and attempts registration procedures on the new cell.

If no other suitable cells are available (NO at step 820), the flowchart 800 transitions to step 825, where the mobile device recovers service in another RAT. In an exemplary aspect, the mobile device 340 can camp on RAT UMTS/GSM (e.g., of the UMTS cell 505) and performs registration procedures. The registration procedures can include, for example, RAU & LAU procedures. In an exemplary aspect, the mobile device can notify the network that the LTE is disabled. For example, the mobile device can notify the network via RAU or GPRS attach procedures.

After step 825, the method 800 transitions to step 830, where the mobile device determines whether: signal conditions of the blocked cell improve, and/or if a suitable LTE neighboring cell with a different cell identification (ID) is detected within the same PLMN or an equivalent PLMN.

In an exemplary aspect, the mobile device 340 can measure and/or analyze one or more wireless characteristics of the block LTE cell and compare the characteristic(s) to one or more threshold values. The wireless characteristics can include signal strength, signal-to-noise ratio, and/or one or more other characteristics as would be understood by one of ordinary skill in the relevant arts. The corresponding threshold values can be predetermined and can be stored within, for example, memory 360. Based on the comparison(s), the mobile device 340 can determine if the blocked LTE cell can now support LTE communications.

In an exemplary aspect, the mobile device 340 can search for one or more suitable LTE neighboring cell with a different cell ID within the same PLMN or an equivalent PLMN.

After step 830, the method 800 transitions to step 835, where the mobile device determines: (1) if the blocked LTE cell can now support LTE communications based on a comparison of the threshold value(s) and the wireless characteristic(s); and/or (2) if a suitable LTE neighboring cell with a different cell ID is detected.

If either (1) of (2) is true (YES at step 835), the flowchart transitions to step 840. Otherwise (NO at step 835), the flowchart returns to step 830, where the mobile device 340 continues to monitor the blocked cell and/or one or more neighboring cells.

At step 840, the mobile device (e.g., 340) camps on the newly detected neighboring cell or the previously blocked cell and attempts to register with the corresponding cell. If the registration results in a failure (e.g. RACH failure), the flowchart 800 returns to step 810 and the number of consecutive failures can be incremented. If the registration is successful (i.e., connection successful), the mobile device (e.g. 340) is serviced by the corresponding cell and the flowchart ends at 845. The flowchart 800 can be repeated for one or more subsequent failures.

In this example, the mobile device can establish service with the new neighboring cell or the previously blocked cell even before the temporary LTE disabled timer has expired, thereby recovering LTE service without the delay typically required systems implementing the 3GPP T3402 timer that blocks LTE communications in their entirety until expiration of the timer.

Figure 9:
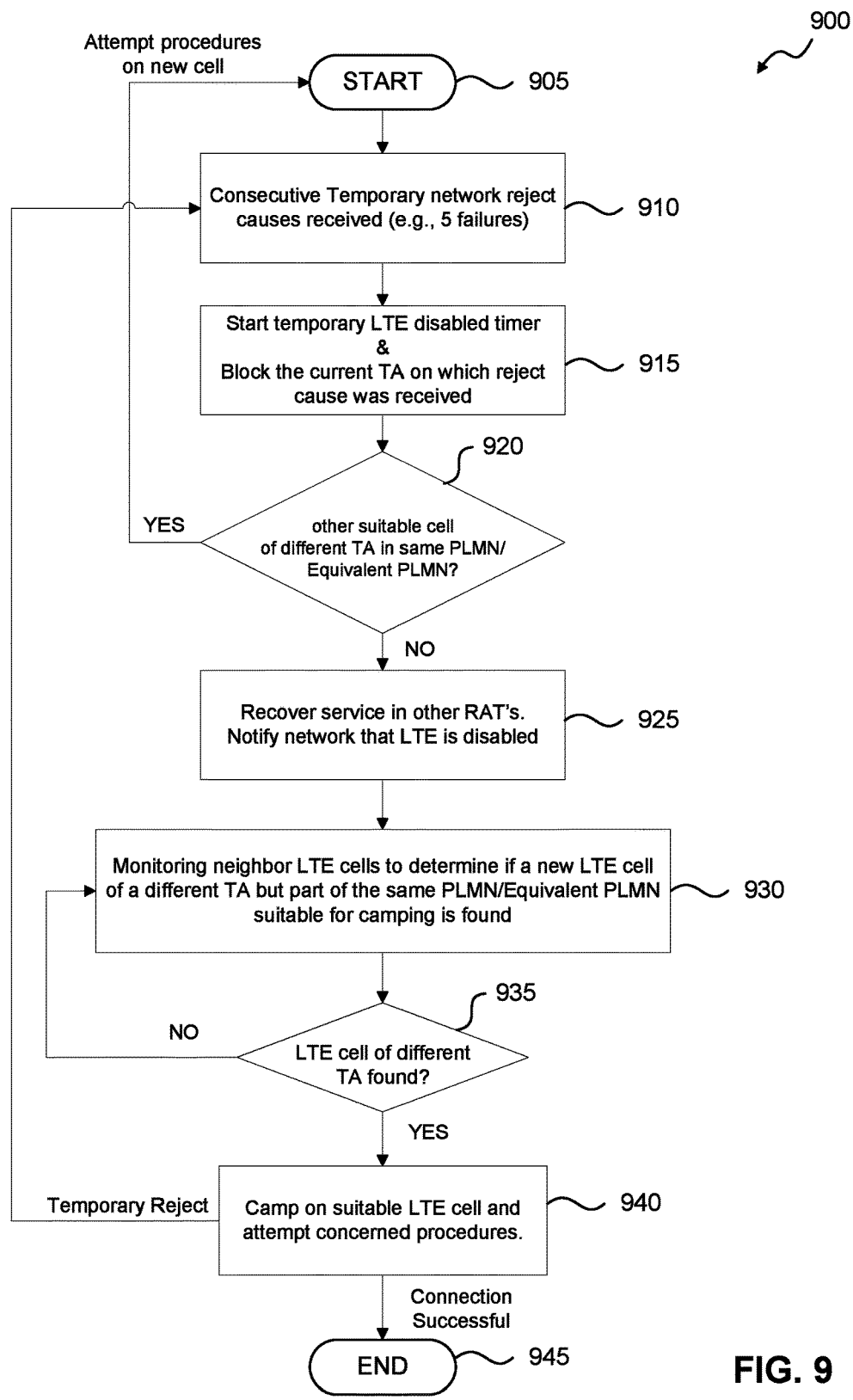
FIG. 9 illustrates communication protocol recovery method according to an exemplary aspect of the present disclosure.

FIG. 9 illustrates a flowchart of communication protocol recovery method 900 of failures within a communication tracking area according to an exemplary aspect of the present disclosure. The flowchart is described with continued reference to FIGS. 1-7. The steps of the method are not limited to the order described below, and the various steps may be performed in a different order. Further, two or more steps of the method may be performed simultaneously with each other.

The method of method 900 begins at step 905 and transitions to step 910, where consecutive temporary network rejection causes are received (e.g., as part of the EMM procedure). In this example, the consecutive temporary network rejection causes exceed a predetermined rejection threshold (e.g., 5 failures as illustrated in FIG. 4). In an exemplary aspect, the temporary network rejection causes are TAU rejection failures in response to TAU requests initiated by the EMM.

After step 910, the method 900 transitions to step 915, where a temporary LTE disabled timer is initiated in response to the consecutive temporary network reject causes and communications on the current LTE TAI (e.g. LTE 610) are blocked. In an exemplary aspect, only the current LTE TAI (e.g., the TA on which the consecutive failures were received) is blocked. In this example, the temporary LTE disabled timer prevents LTE communications with only the blocked LTE TAI until the timer expires.

In an exemplary aspect, the EMM initiates the temporary LTE disabled timer in response to the TAU rejection failures. In an exemplary aspect, the temporary LTE disabled timer is defined by the mobile device (e.g., processor circuitry 350 initiates a timer of a value obtained from memory 360) and disables the LTE communications of the mobile device until expiration of the timer. In another exemplary aspect, the temporary LTE disabled timer can be defined by the network (e.g., the timer has a duration of the 3GPP's T3402 timer).

In an exemplary aspect, the mobile device 340 is configured to disable LTE communication based on the temporary LTE disabled timer for the blocked TAI. For example, the mobile device 340 can disable the LTE communications in response to the timer being initiated by the EMM. In operation, the mobile device 340 can disable LTE communication with only the blocked TAI.

In an exemplary aspect, the mobile device 340 is configured to categorize the failure as a failure on the TA level. That is, there may be other LTE cells within other tracking areas of the PLMN that can serve the mobile device. By categorizing the failure to a TA level failure of the current serving cell, the mobile device 340 can block communications only to the TA in which the failure occurred. That is, the blocked communications via the temporary LTE disabled timer apply only to the blocked TAI (e.g., TAI 610). Therefore, as discussed in detail below, the mobile device 340 can recover LTE service as soon as a change in the servicing TAI (e.g., cell 615) is detected by the mobile device 340.

After step 915, the method 900 transitions to step 920, where it is determined whether there are one or more other suitable cells of a different TA in the PLMN or within an equivalent PLMN. For example, the mobile device determines that another suitable LTE TAI within the same PLMN is available.

If available (YES at step 920), the flowchart 900 returns to step 905 and attempts registration procedures on the new TAI (e.g., TAI 615).

If no other suitable cells are available (NO at step 920), the flowchart 900 transitions to step 925, where the mobile device recovers service in another RAT. In an exemplary aspect, the mobile device 340 can camps on RAT UMTS (e.g., of the UMTS cell 505) and performs registration procedures. The registration procedures can include, for example, RAU & LAU procedures. In an exemplary aspect, the mobile device can notify the network that the LTE is disabled. For example, the mobile device can notify the network via RAU or GPRS attach procedures.

After step 925, the method 900 transitions to step 930, where the mobile device monitors neighboring LTE cell of a different TA within the same PLMN or an equivalent PLMN. The monitoring is performed to determine whether a suitable neighboring LTE cell of a different TA within the same PLMN or an equivalent PLMN is detected. In an exemplary aspect, the mobile device 340 can search for one or more suitable LTE neighboring cell within a different TA but within the same PLMN or an equivalent PLMN.

After step 930, the method 900 transitions to step 935, where the mobile device determines if a suitable LTE neighboring cell within a different TA is detected.

If a suitable LTE cell is detected, (YES at step 935), the flowchart transitions to step 940. Otherwise (NO at step 935), the flowchart returns to step 930, where the mobile device 340 continues to monitor for one or more neighboring cells of different TAs.

At step 940, the mobile device (e.g., 340) camps on the newly detected neighboring cell (of the different TA) and attempts to register with the corresponding cell. If the registration results in a failure (e.g. temporary rejection), the flowchart 900 returns to step 910 and the number of consecutive failures can be incremented. If the registration is successful (i.e., connection successful), the mobile device (e.g. 340) is serviced by the corresponding cell and the flowchart ends at 945. The flowchart 900 can be repeated for one or more subsequent failures.

In this example, the mobile device can establish service with the new neighboring cell even before the temporary LTE disabled timer has expired, thereby recovering LTE service without the delay typically required systems implementing the 3GPP T3402 timer that blocks LTE communications in their entirety until expiration of the timer.

Examples

Example 1 is a wireless communication recovery method of a communication device, the method comprising: detecting a connection failure of a radio access technology (RAT); categorizing the detected connection failure based on a network level at which the connection failure has occurred; and disabling the RAT at the corresponding network level for a time period based on the categorization of the connection failure.

In Example 2, the subject matter of Example 1, wherein the categorizing the connection failure comprises: determining the network level at which the connection failure has occurred; and categorizing the detected connection failure based on the determined network level.

In Example 3, the subject matter of Example 1, wherein the network level comprises at least one of: a serving cell network level; a tracking area network level; and a communication network level.

In Example 4, the subject matter of Example 1, wherein disabling the RAT at the corresponding network level comprises disabling the RAT only for a cell serving the communication device.

In Example 5, the subject matter of Example 1, wherein disabling the RAT at the corresponding network level comprises disabling the RAT only for a tracking area of a cell serving the communication device.

In Example 6, the subject matter of Example 1, wherein disabling the RAT at the corresponding network level comprises disabling the RAT only for a public land mobile network (PLMN) area of a cell serving the communication device.

In Example 7, the subject matter of Example 1, wherein the time period is determined based on a timer initiated in response to the connection failure being one of consecutive connection failures, and wherein the connection failure has exceeded a predetermined failure threshold.

In Example 8, the subject matter of Example 1, wherein the connection failure is a Random Access Channel (RACH) failure and the network level is a serving cell of the RAT.

In Example 9, the subject matter of Example 1, wherein the connection failure is a temporary network rejection and the network level is a tracking area of a serving cell.

In Example 10, the subject matter of Example 1, wherein the connection failure is a temporary network rejection and the network level is a public land mobile network (PLMN) area of a serving cell.

Example 11 is a communication device operable to perform a wireless communication recovery operation, the communication device comprising: a transceiver configured to communicate via a radio access technology (RAT); and a controller configured to: detect a connection failure of the RAT; categorize the detected connection failure based on a network level at which the connection failure has occurred; and disable the RAT at the corresponding network level for a time period based on the categorization of the connection failure.

In Example 12, the subject matter of Example 11, wherein the controller is configured to: determine the network level at which the connection failure has occurred; and categorize the detected connection failure based on the determined network level.

In Example 13, the subject matter of Example 11, wherein the network level comprises at least one of: a serving cell network level; a tracking area network level; and a communication network level.

In Example 14, the subject matter of Example 11, wherein disabling the RAT at the corresponding network level comprises disabling the RAT for only a cell serving the communication device.

In Example 15, the subject matter of Example 11, wherein disabling the RAT at the corresponding network level comprises disabling the RAT for only a tracking area of a cell serving the communication device.

In Example 16, the subject matter of Example 11, wherein disabling the RAT at the corresponding network level comprises disabling the RAT for only a public land mobile network (PLMN) of a cell serving the communication device.

In Example 17, the subject matter of Example 11, wherein the time period is determined based on a timer initiated in response to the connection failure being one of consecutive connection failures, and wherein the connection failure has exceeded a predetermined failure threshold.

In Example 18, the subject matter of Example 17, wherein the controller is configured to set the time period of the timer based on timer information stored within a memory of the communication device.

In Example 19, the subject matter of Example 11, wherein the connection failure is a Random Access Channel (RACH) failure and the network level is a serving cell of the RAT.

In Example 20, the subject matter of Example 11, wherein the connection failure is a temporary network rejection and the network level is a tracking area of a serving cell.

In Example 21, the subject matter of Example 11, wherein the connection failure is a temporary network rejection and the network level is a public land mobile network (PLMN) area of a serving cell.

Example 22 is a wireless communication recovery method of a communication device, the method comprising: detecting a connection failure of a radio access technology (RAT); categorizing the detected connection failure as: a first connection failure type in response to the connection failure occurring at a first network level, and a second connection failure type in response to the connection failure occurring at a second network level, wherein the second network level is greater than the first network level; and disabling the RAT at the first network level for a time period based on the categorization of the detected connection failure as the first connection failure type and at the second network level for the time period based on the categorization of the detected connection failure as the second connection failure type.

In Example 23, the subject matter of Example 22, wherein: the first network level is a serving cell network level corresponding to a cell serving the communication device; and the second network level is a tracking area network level corresponding to the tracking area of which the cell serving the communication device is located.

In Example 24, the subject matter of Example 23, wherein: categorizing the detected connection failure further comprises categorizing the detected connection as a third connection failure type in response to the connection failure occurring at a third network level, the third network level being greater than the second network level; and the third network level is a public land mobile network (PLMN) level corresponding to a PLMN of which the cell serving the communication device is located.

In Example 25, the subject matter of Example 24, wherein: disabling the RAT at the first network level comprises disabling the RAT only for the cell serving the communication device when the connection failure occurred; disabling the RAT at the second network level comprises disabling only for the tracking area of the cell serving the communication device when the connection failure occurred; the disabling the RAT further comprises disabling the RAT at the third network level for a time period based on the categorization of the detected connection failure as the third connection failure type; and disabling the RAT at the third network level comprises disabling the RAT only for the PLMN of which the cell serving the communication device is located when the connection failure occurred.

Example 26 is an apparatus comprising means to perform the method as claimed in any of claims 1-10 and 22-25.

Example 27 is a computer program product embodied on a computer-readable medium comprising program instructions, when executed, causes a machine to perform the method of any of claims 1-10 and 22-25.

Example 28 is an apparatus substantially as shown and described.

Example 29 is a method substantially as shown and described.

Conclusion

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE) and can be applied to other cellular communication standards, including (but not limited to), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (Wi-MAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A wireless communication recovery method of a communication device, the method comprising:
    detecting a connection failure of a radio access technology (RAT) between the communication device and a network entity;
    categorizing the detected connection failure based on a network level that includes the network entity at which the connection failure has occurred; and
    disabling the RAT for a time period at the network level that corresponds to the category of the connection failure that includes the network entity to block communications during the time period between the communication device and the network entity,
    wherein the category associated with the connection failure includes a tier of network entities associated with operation within a communication network.

2. The wireless communication recovery method of claim 1, wherein the categorizing the connection failure comprises:
    determining the network level that includes the network entity at which the connection failure has occurred; and
    categorizing the detected connection failure based on the determined network level.

3. The wireless communication recovery method of claim 1, wherein the network level that includes the network entity comprises at least one of:
    a serving cell network level;
    a tracking area network level; and
    a communication network level.

4. The wireless communication recovery method of claim 1, wherein disabling the RAT at the corresponding network level that includes the network entity comprises disabling the RAT only for a cell serving the communication device.

5. The wireless communication recovery method of claim 1, wherein disabling the RAT at the corresponding network level that includes the network entity comprises disabling the RAT only for a tracking area of a cell serving the communication device.

6. The wireless communication recovery method of claim 1, wherein disabling the RAT at the corresponding network level that includes the network entity comprises disabling the RAT only for a public land mobile network (PLMN) area of a cell serving the communication device.

7. The wireless communication recovery method of claim 1, wherein the time period is determined based on a timer initiated in response to the connection failure being one of consecutive connection failures, and wherein the connection failure has exceeded a predetermined failure threshold.

8. The wireless communication recovery method of claim 1, wherein the connection failure is a Random Access Channel (RACH) failure and the network level is a serving cell of the RAT.

9. The wireless communication recovery method of claim 1, wherein the connection failure is a temporary network rejection and the network level that includes the network entity is a tracking area of a serving cell.

10. The wireless communication recovery method of claim 1, wherein the connection failure is a temporary network rejection and the network level that includes the network entity is a public land mobile network (PLMN) area of a serving cell.

11. A communication device operable to perform a wireless communication recovery operation, the communication device comprising:
    a transceiver configured to communicate via a radio access technology (RAT); and
    a controller configured to:
        detect a connection failure of the RAT between the communication device and a network entity;
        categorize the detected connection failure based on a network level that includes the network entity at which the connection failure has occurred; and
        disable the RAT for a time period at the network level that corresponds to the category of the connection failure that includes the network entity to block communications during the time period between the communication device and the network entity,
    wherein the time period is determined based on a timer initiated in response to the connection failure being one of consecutive connection failures, and wherein the connection failure has exceeded a predetermined failure threshold.

12. The communication device of claim 11, wherein the controller is configured to:
    determine the network level that includes the network entity at which the connection failure has occurred; and
    categorize the detected connection failure based on the determined network level.

13. The communication device of claim 11, wherein the network level that includes the network entity comprises at least one of:
    a serving cell network level;
    a tracking area network level; and
    a communication network level.

14. The communication device of claim 11, wherein disabling the RAT at the corresponding network level that includes the network entity comprises disabling the RAT for only a cell serving the communication device.

15. The communication device of claim 11, wherein disabling the RAT at the corresponding network level that includes the network entity comprises disabling the RAT for only a tracking area of a cell serving the communication device.

16. The communication device of claim 11, wherein disabling the RAT at the corresponding network level that includes the network entity comprises disabling the RAT for only a public land mobile network (PLMN) of a cell serving the communication device.

17. The communication device of claim 11, wherein the controller is configured to set the time period of the timer based on timer information stored within a memory of the communication device.

18. The communication device of claim 11, wherein the connection failure is a Random Access Channel (RACH) failure and the network level that includes the network entity is a serving cell of the RAT.

19. The communication device of claim 11, wherein the connection failure is a temporary network rejection and the network level that includes the network entity is a tracking area of a serving cell.

20. The communication device of claim 11, wherein the connection failure is a temporary network rejection and the network level that includes the network entity is a public land mobile network (PLMN) area of a serving cell.

21. A wireless communication recovery method of a communication device, the method comprising:
    detecting a connection failure of a radio access technology (RAT) between the communication device and one of a plurality of network entities;
    categorizing the detected connection failure as: (i) a first connection failure type in response to the connection failure occurring at a first network level that includes a first one of the plurality of network entities at which the connection failure has occurred, the first network level being associated with a first cell coverage area, and (ii) a second connection failure type in response to the connection failure occurring at a second network level that includes a second one of the plurality of network entities at which the connection failure has occurred, the second network level being associated with a second cell coverage area, the second cell coverage area being greater than the first cell coverage area; and
    blocking, at the first network level or the second network level, communications during a time period between the communication device and one or more of the plurality of network entities included in the first network level or second level by:
        when the detected connection failure is categorized as the first connection failure type, disabling the RAT during the time period at the first network level; and
        when the detected connection failure is categorized as the second connection failure type, disabling the RAT during the time period at the second network level.

22. The wireless communication recovery method of claim 21, wherein:
    the first network level is a serving cell network level corresponding to a cell serving the communication device; and
    the second network level is a tracking area network level corresponding to the tracking area of which the cell serving the communication device is located.

23. The wireless communication recovery method of claim 22, wherein:
    categorizing the detected connection failure further comprises categorizing the detected connection as a third connection failure type in response to the connection failure occurring at a third network level that includes a third one of the plurality of network entities at which the connection failure has occurred, the third network level being associated with a third cell coverage area, the third cell coverage area being greater than the second cell coverage area; and
    the third network level is a public land mobile network (PLMN) level corresponding to a PLMN of which the cell serving the communication device is located.

24. The wireless communication recovery method of claim 23, wherein disabling the RAT at the first network level comprises disabling the RAT only for the cell serving the communication device when the connection failure occurred, and
    wherein disabling the RAT at the second network level comprises disabling only for the tracking area of the cell serving the communication device when the connection failure occurred, and further comprising:
        when the detected connection failure is categorized as the third connection failure type, disabling the RAT during the time period at the third network level by disabling the RAT only for the PLMN of which the cell serving the communication device is located when the connection failure occurred.

25. The wireless communication recovery method of claim 1, wherein the act of disabling the RAT for a time period further comprises:
    when the categorized network level includes one or more other network entities, blocking communications during the time period between the communication device and one or more other network entities included within the categorized network level associated with the network entity.

26. The wireless communication recovery method of claim 1, wherein the RAT is enabled after expiration of the time period to recover wireless communications by performing a registration procedure with another network entity that is different than the network entity associated with the connection failure.

27. The wireless communication recovery method of claim 26, wherein the another network entity associated with the recovery of wireless communications is of an equal network tier as the network entity associated with the connection failure.

* * * * *